United States Patent
Poloni

[19]

[11] Patent Number: 6,070,510
[45] Date of Patent: *Jun. 6, 2000

[54] HIGH-SPEED FLYING SHEARS AND METHOD EMPLOYING THIS FLYING SHEARS TO SHEAR THE LEADING AND TRAILING ENDS OF A ROLLING BAR

[75] Inventor: Alfredo Poloni, Redipuglia, Italy

[73] Assignee: Danieli & C. Officine Meccaniche SpA, Buttrio, Italy

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/950,739

[22] Filed: Oct. 15, 1997

Related U.S. Application Data

[63] Continuation of application No. 08/339,892, Nov. 14, 1994, abandoned.

[30] Foreign Application Priority Data

Nov. 14, 1994 [IT] Italy ................. UD93A0242

[51] Int. Cl.[7] ................................. B23D 25/12
[52] U.S. Cl. ................... 83/37; 83/105; 83/303; 83/306
[58] Field of Search .................. 83/13, 37, 42, 83/303, 306, 105, 106, 107, 439

[56] References Cited

U.S. PATENT DOCUMENTS

| | | | |
|---|---|---|---|
| 2,414,772 | 1/1947 | Sheperdson | 83/106 |
| 3,834,260 | 9/1974 | Sieurin et al. | 83/106 |
| 4,176,535 | 12/1979 | Elsner et al. | 83/105 |
| 4,977,806 | 12/1990 | Poloni | 83/306 |

FOREIGN PATENT DOCUMENTS

| | | | |
|---|---|---|---|
| 259600 | 8/1987 | European Pat. Off. | B23D 25/12 |
| 299220 | 6/1988 | European Pat. Off. | B23D 33/02 |
| 510400 | 4/1992 | European Pat. Off. | B23D 25/14 |
| 618033 | 3/1994 | European Pat. Off. | |
| 666433 | 12/1928 | France | B23D 25/12 |
| 1355123 | 2/1964 | France | 83/306 |
| 2900013 | 1/1979 | Germany | B23D 33/02 |

*Primary Examiner*—Rinaldi I. Rada
*Assistant Examiner*—Charles Goodman
*Attorney, Agent, or Firm*—Antonelli, Terry, Stout & Kraus, LLP

[57] ABSTRACT

High-speed flying shears and method employing the same with contrarotating blades (13) and scrap-shearing blades (18) fitted side by side to blade-holder drums (30), which is suitable to shear bars (11) travelling at 120 meters per second or more, the shears comprising upstream a first one-channel switch (16) of a start/stop type and downstream a second one channel switch conveying the bars (11) lengthwise and capable of being oriented in synchronization laterally by rotation on a plane substantially containing the axis of travel of the bars (11) and parallel to, and between, the planes containing the axes (12) of rotation of the pair of blade-holder drums (30) so as to make the bars (11) pass in the shearing area (35), the circumferential position of the blades (13) being associated with the lateral position of the first one-channel switch (16) at least in the transient moment of the passing of the bars (11) in the shearing area (35), the first and second switches (16–20) having at least a first extreme position (A–A'), a second extreme position (D–D') and a position for the passage of a bar (E), the position (E) for the feed of the bar (11) being in the vicinity of the first shearing blades (13) and located on the same side as the second extreme position (D–D').

30 Claims, 6 Drawing Sheets

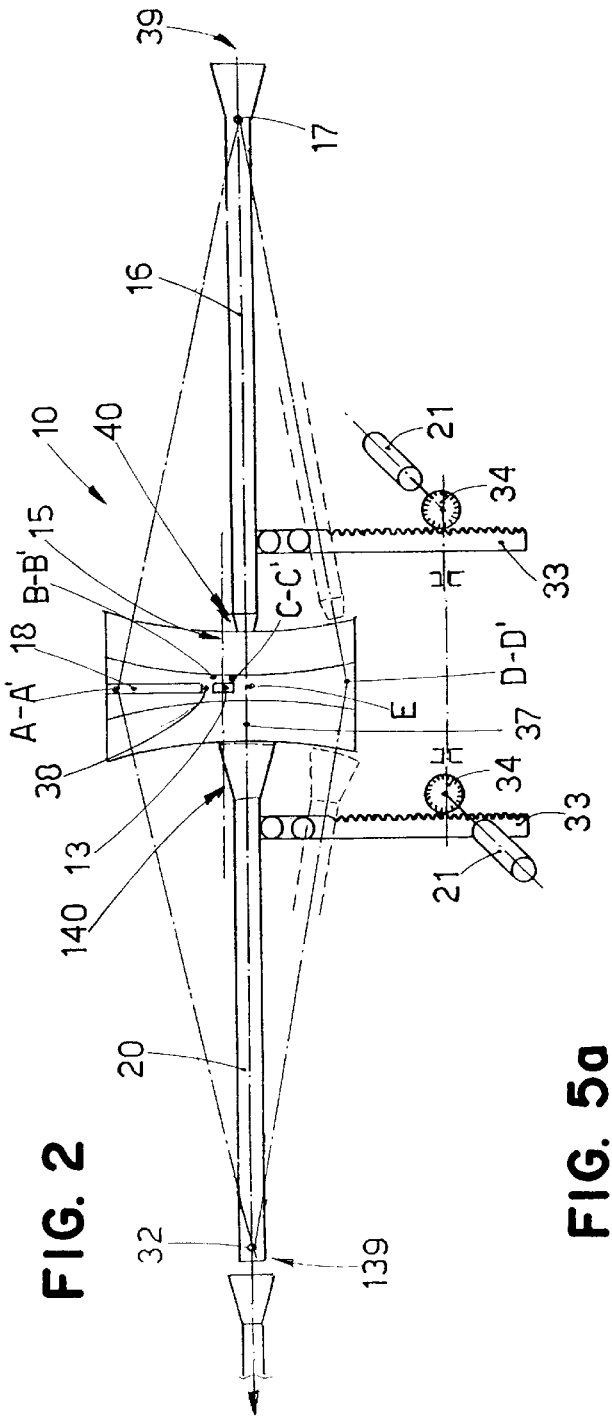
FIG. 2
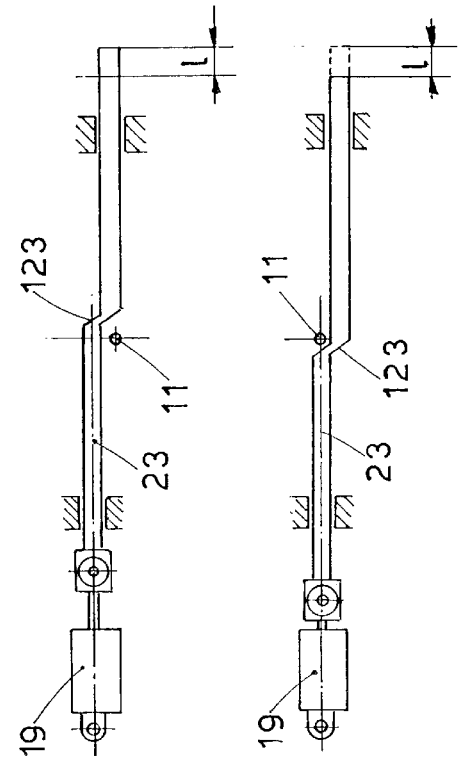
FIG. 5a
FIG. 5b

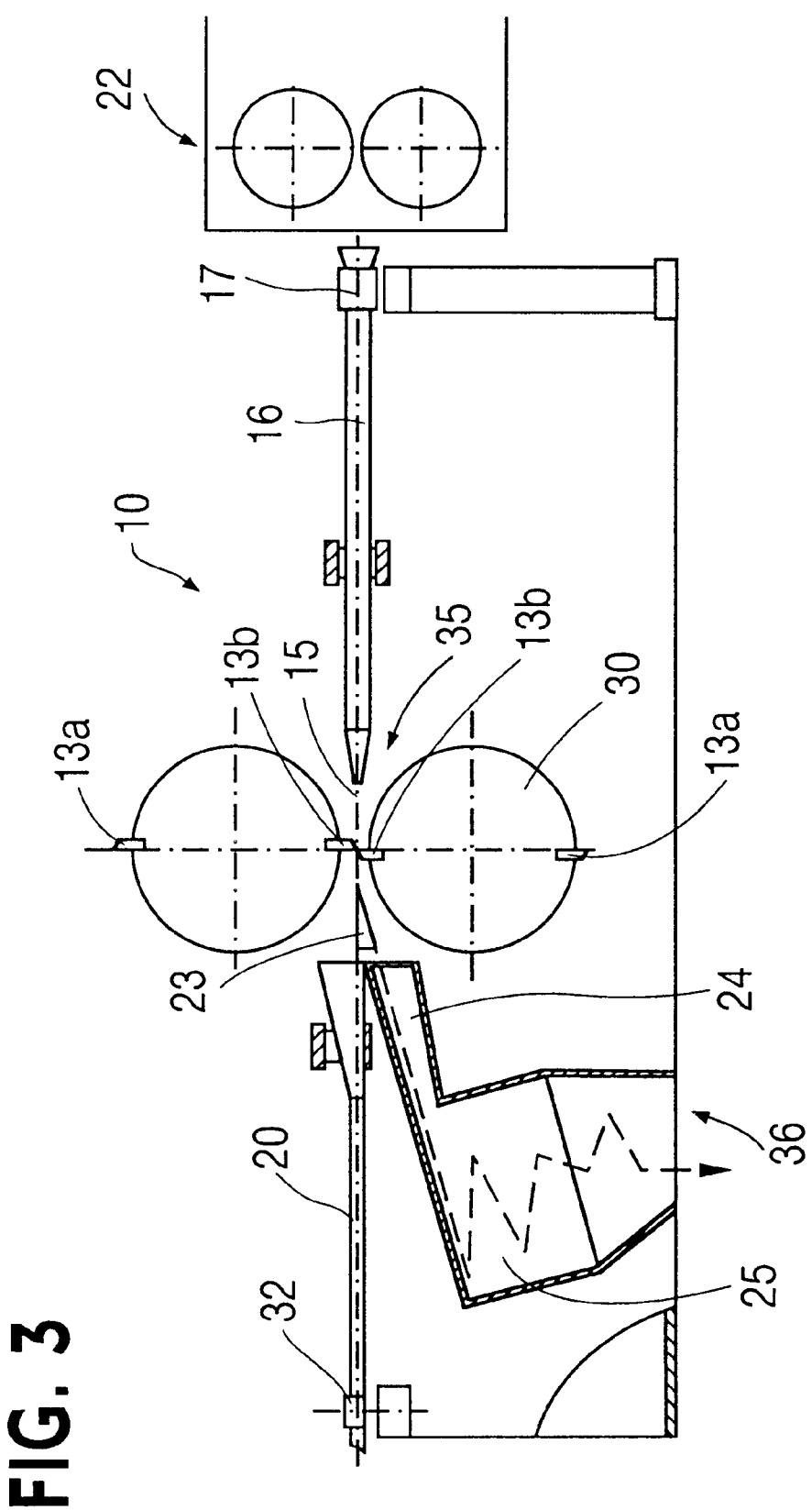

HIGH-SPEED FLYING SHEARS AND METHOD EMPLOYING THIS FLYING SHEARS TO SHEAR THE LEADING AND TRAILING ENDS OF A ROLLING BAR

This application is a Continuation of application Ser. No. 08/339,892, filed Nov. 14, 1994, now abandoned.

BACKGROUND OF THE INVENTION

This invention concerns a high-speed flying shears.

The invention concerns also a method employing this flying shears to shear the leading and trailing ends of a rolled bar, as set forth in the relative main claim.

The flying shears according to the invention acts on rolled stock, whether the rolled stock be a wire rod, or a section to be supplied in bars leaving the last rolling mill stand of a rolling train.

The flying shears according to the invention is suitable to shear rolled stock travelling at even more than 120 meters per second.

It is known that the leading and trailing ends of the rolled stock leaving the last rolling mill stand of a rolling train include along their length geometric deformations, non-homogeneous structures or unacceptable inclusions and therefore have to be removed; this removal is carried out generally in the line with a flying shears.

The state of the art contains various disclosures of high-speed flying shears for rolled stock.

Embodiments which are substantially efficient but have been found unsatisfactory for rolled stock travelling at very high speeds are disclosed in FR-666.433, DE-804.056, GB-2,075,899 and FR-1.578.587.

To be more exact, these disclosed embodiments are not able to meet the required accuracy of shearing nor the required high speed.

Moreover, these embodiments entail the problem of discharging, shearing for scrap and recovering the end segments sheared by the flying shears.

Theses embodiments also involve the problems of energy consumption and the obtaining of samples.

FR-A-666.433, for instance, discloses a flying shears governed by a rolling assembly that shears the rolled stock to size with rotating blades. According to this document the rolled stock is momentarily switched along a loop so that the shearing can be performed. Even if the disclosed drive and control system is used, the invention disclosed in this document, owing to the formation of the loop, is only suitable to process rolled stock travelling at medium speeds. Moreover, no mention is made of the problem of shearing for scrap the sheared leading and trailing end segments or of obtaining sample segments.

U.S. Pat. No. 3,834,260, U.S. Pat. No. 5,040,440 and DE-A-2.900.013 disclose a flying shears employed to shear the leading and trailing ends of bars leaving a rolling train but do not describe a cycle to shear for scrap the leading and trailing end segments of the bar nor a strictly and accurately guided path of the bar downstream of the shearing area for delivery of the bar to the coiling step.

Moreover, these documents open the shears in the steps preceding and following the shearing of the leading and trailing ends; the bar is directed along a fixed and substantially straight path during the whole working cycle. This entails a very heavy load of power absorbed and dispersed by the actuation and braking means of these shears since it is necessary to bring these shears in a very short time to a very high peripheral speed substantially coinciding advantageously with the speed of feed of the bar. In the same very short time it is necessary to brake the shears, when shearing has taken place, so as to prevent the shears coming into contact again with the bar passing through.

Furthermore, this solution involves great operational difficulties in making the shears act on the bar at the exact required moment and with the necessary accuracy. In fact, extreme accuracy of shearing is achieved only by obtaining a very strict correlation between the feed of the rolled material about to have its leading and trailing ends cropped and the circumferential position of the rotating blades. All these operating problems prevent the use of the shears disclosed in these documents when the speeds of feed of the bar are greater than 60 to 80 meters per second. Besides, these documents do not teach the obtaining of sample segments.

DE-A-3.027.978 discloses a guide element which can be displaced in relation to the shearing zone so as to convey the bar lengthwise in coincidence with the blades only at the shearing moment. However, this document provides a very limited movement of this guide element and entails also in this case sharp accelerations and decelerations in a very short time if it is desired to obtain a substantial coincidence of the speed of feed of the bar with the peripheral speed of the blades.

Moreover, the movement of the guide element after the shearing of the leading end of the bar includes the return of that element to its starting position and involves of necessity the opening of the blades to prevent contact between the blades and the bar passing through.

This situation entails further structural and working complexity which prevents the device disclosed in this document from being able to be used with the high speeds required in the present production technology.

IT-A-1.214.194 in the name of the present applicants discloses a high-speed flying shears having contrarotating blades and cooperating upstream with a switch of a start-stop type. This switch is suitable to convey the rolled stock lengthwise and to be displaced laterally so as to make the rolled stock pass into the shearing area between the contrarotating blades only at the shearing moment.

The circumferential position of the contrarotating blades can be linked to the lateral position of the switch so as to determine exactly the moment when the rolled stock lies between the blades, this moment coinciding with the best shearing position of the blades themselves.

The speed of lateral displacement too of the switch is correlated functionally with the peripheral speed of the contrarotating blades, so that there is a substantial coincidence of these speeds at the shearing moment. The blade-holder drums are brought to the required peripheral speed and are then braked, when shearing has taken place, in a progressive manner in view of the fact that the bar does not pass through the shearing area before and after performance of the shearing of the leading and trailing ends. Furthermore, this document does not teach the obtaining of sample segments.

This embodiment, whilst satisfactory in itself, entails the drawback that the rolled stock leaving the shearing step is difficult to guide correctly towards the downstream stations, and this drawback involves vibrations and inaccuracies in the directing of the rolled stock towards the respective channels.

Moreover, this embodiment does not provide any natural guiding for the intake of the material downstream of the shearing assembly, whether that material consists of a bar deprived of its leading and trailing ends and directed towards a coil-forming headstock or consists of the sheared segments directed towards the scrap-shears.

The present applicants have also disclosed in document EP-A-0618033 a flying shears cooperating downstream with coiling and scrap-shearing stations; in this shears the directing of the material towards the respective stations is carried out with a two-channel switch positioned immediately downstream of the shearing assembly.

The inclusion of a specific scrap-shearing station downstream of the shears and the complexity of embodying and operating the two-channel switch so as to ensure correct directing of the material without any risks of jamming or impacts makes the flying shears disclosed in this document rather expensive.

SUMMARY OF THE INVENTION

Taking further the teaching of the documents cited above, the present applicants have designed and embodied an improvement of the above flying shears, this improvement overcoming the drawbacks of the state of the art and having the purpose of achieving further advantages.

The flying shears according to the invention is suitable to cooperate downstream with an assembly that coils the bar after the bar has had its leading and trailing ends removed.

In the following description of the invention we shall write of a bar but shall also mean thereby wire rods, round concrete-reinforcement rods and other analogous types of products leaving a rolling train.

According to the invention the flying shears includes one-channel switches of a start-stop type which are arranged respectively upstream and downstream of the shearing assembly and which are substantially of a known type and are suitable to convey the bar lengthwise during its travel within the flying shears.

These switches consist substantially of guide tubes which stretch lengthwise to the vicinity of the shearing area and which have their end farthest from the shearing area pivoted at a fixed point.

The switch located upstream of the shearing assembly guides the bar leaving the rolling train towards the shearing assembly, whereas the switch located downstream guides the bar, now deprived of its leading end, towards a coil-forming headstock or coiling device.

The inclusion of the one-channel switch downstream of the shearing assembly is required to ensure elimination of vibrations of the bar leaving the shearing step and to guide the bar correctly towards the coil-forming headstock.

The one-channel switches are able to be oriented laterally by rotation in a coordinated and synchronised manner on a plane parallel to, and between, the planes containing the axes of rotation of the blades of the shearing assembly; this plane of lateral orientation of the switches contains the shearing axis.

Both the one-channel switch upstream of the shearing assembly and the one-channel switch downstream of the shearing assembly are actuated on their plane of orientation by respective synchronised displacement means connected together mechanically or electrically or independent of each other.

The bar, upon reaching a given longitudinal position upstream of the shearing assembly, causes the start-up of the lateral orientation of the switches, which, by moving, make the bar pass through the shearing area only at the exact required shearing moment.

In this way the blade-holder drums can be brought to the required peripheral speed necessary for the shearing and can then be braked, with gradients of acceleration and deceleration with a moderate slope, as there is no need to prevent the blades acting on the bar at undesired times inasmuch as the bar is conveyed by the switches to the shearing area only at the desired shearing moment.

The switches have an initial first extreme position, whence they are displaced in acceleration so as to bring the bar to the shearing area.

When the leading end of the bar has been sheared, the switches are braked while continuing their decelerated travel substantially as far as the second extreme position and then return backwards towards the shearing area and halt alongside the shearing blades without passing beyond the blades again, and therefore halt on the side corresponding to the second extreme position with the whole length of the passing bar before the start of the cycle to shear the trailing end.

The switches take up a bar feeding position substantially on the same axis as the direction of feed of the bar and as the axis of coiling of the coil-forming headstock (if included), the purpose being to reduce to a minimum the deflection of the bar during all the feed of the bar, for a deflection could entail problems for the coiling and for the upstream rolling path.

When the cycle of shearing the trailing end is started, the switches are again displaced towards the second extreme position so as to start their accelerated travel and are then displaced in acceleration towards the shearing area so as to position the bar in the shearing area at the moment calculated for the shearing of the trailing end.

When the trailing end has been sheared, the switches are braked and halted at the first extreme position to await a new bar.

The speed of lateral displacement of the switches is correlated, at least in the transient moment of shearing, with the circumferential position and speed of rotation of the blades shearing the leading and trailing ends so that the moment of the passage of the bar between the blades coincides with the required shearing position of the blades themselves.

According to a variant of the invention the flying shears has a step of scrap-shearing the leading end segment and a step of scrap-shearing the trailing end segment.

To be more exact, the step of scrap-shearing the leading end segment precedes the shearing of the leading end and is carried out during the displacement and acceleration of the switches from their first extreme position to the shearing zone.

The step of scrap-shearing the trailing end segment follows the shearing of the trailing end and is carried out during the decelerated displacement of the switches in an inverted direction from the shearing zone to the first extreme position.

So as to carry out these scrap-shearing steps, second blade-holder drums are included, in a position at the side of and parallel to the first drums holding the blades shearing the leading and trailing ends and in a required number depending on the required length of the sheared scrap, and bear further pairs of opposed blades specifically required for the scrap shearing; these second drums bearing the scrap-shearing blades and the first drums bearing the shearing blades are advantageously actuated independently of each other.

According to a variant the second drums bearing the scrap-shearing blades and the first drums bearing the shearing blades are fitted to a single-actuation drive shaft.

According to another variant single drums are included to bear the scrap-shearing blades and the shearing blades.

The plane of positioning of the scrap-shearing blades is arranged at the side of the plane of positioning of the shearing blades and in the tract which runs from the starting position of the one-channel switches, or first extreme position, to the zone of shearing of the leading and trailing ends.

The scrap-shearing blades cooperate at their lower end with means that collect, brake and possibly discharge the scrap-sheared segments.

According to a variant of the invention a space without blades is included between the scrap-shearing blades and the shearing blades; this space has the purpose of providing leading and trailing end segments long enough to be used as samples for possible inspections and metallurgical analyses.

These leading and trailing end segments for analysis as samples can be collected together with the scrap-sheared segments and be identified by their greater length.

According to a variant the means that collect the scrap-sheared segments are equipped to sort the sample segments from the other scrap-sheared segments.

According to the invention the first shearing blades include a pair of opposed blades specifically included to shear the leading end and a pair of opposed blades specifically included to shear the trailing end.

In particular, the pair of opposed blades to shear the leading end is conformed in such a way as to guide the point of the bar so as to direct that bar correctly into the one-channel switch positioned downstream of the shearing area.

The pair of opposed blades to shear the trailing end is conformed in such a way as to guide the trailing end of the bar so as to direct the sheared segment of the trailing end, which is thereafter scrap-sheared, towards the collection means.

By means of this arrangement the delivery of the bar into the downstream one-channel switch or of the segments towards the collection means, after the shearing of the leading and/or trailing ends, is as natural as possible.

The scrap-shearing blades too are all arranged in such a way as to direct the point of the sheared segments downwards, namely towards the means that collect and discharge the scrap.

According to the invention the flying shears includes a deflector plate positioned immediately downstream of the blades shearing the leading and trailing ends.

This movable deflector plate is actuated in coordination with the performance of the shearing of the leading and trailing ends and has the purpose of directing correctly the bar to be coiled into the one-channel switch positioned downstream and of directing correctly the sheared leading and trailing end segments towards the relative collection and braking means.

This movable deflector plate is suitable to take up a first position for the arrangement and guiding of the bar for the shearing of the leading end and a second position for the arrangement and guiding of the bar for the shearing of the trailing end.

The flying shears according to the invention cooperates upstream and downstream with drawing assemblies, for instance of a pinch-roll type.

The upstream drawing assembly has the task of providing drawing of the bar, particularly after execution of the shearing of the leading end, this drawing having the purpose of preventing vibrations of the bar and of minimising the risks of jamming in the fast rolling mill stand.

The downstream drawing assembly may possibly be eliminated by bringing close to the shears the drawing assembly of the coil-forming headstock and by making use of its drawing action on the rolled stock.

BRIEF DESCRIPTION OF THE DRAWINGS

The attached figures are given as a non-restrictive example and show a preferred embodiment of the invention as follows:

FIG. 2 is a diagram of a particular form of embodiment of the shearing area of the flying shears according to the invention;

FIG. 3 is a diagrammatic side view of the flying shears according to the invention;

FIGS. 5a and 5b show the working cycle of the movable deflector plate;

DETAILED DESCRIPTION OF THE PREFERRED EMBODIMENTS

Figure 1:
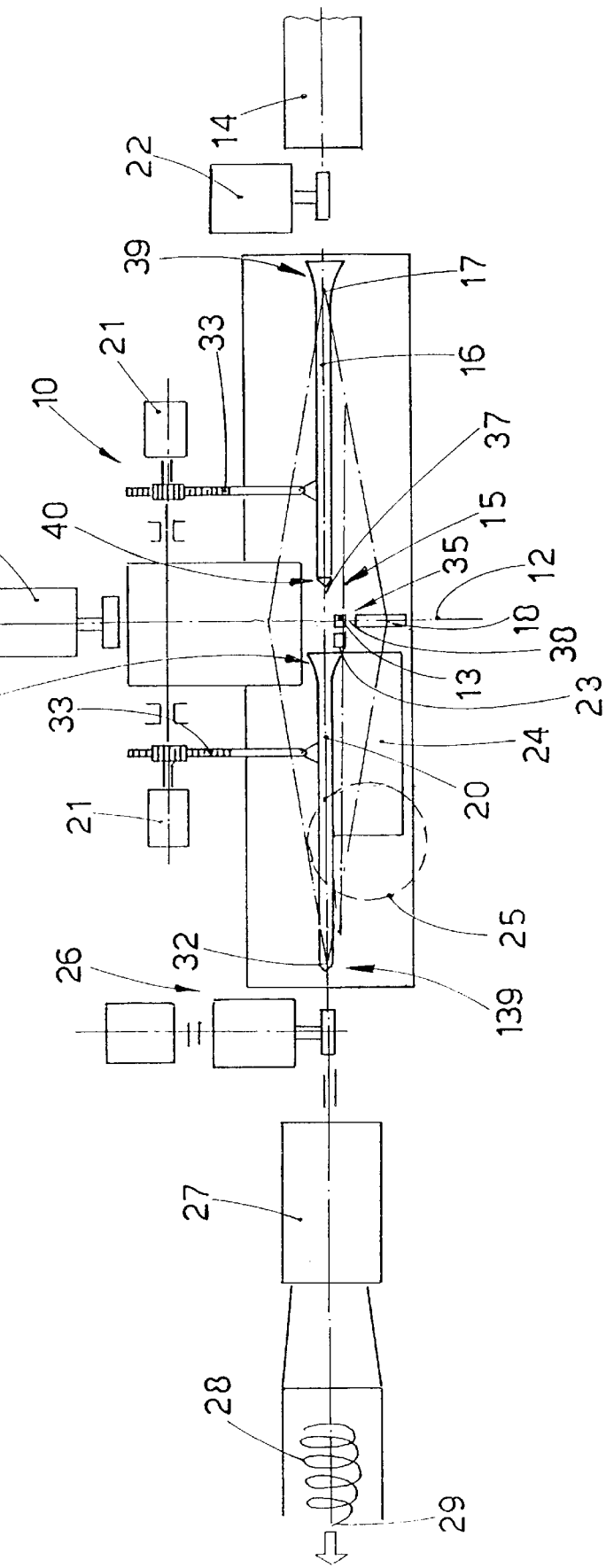
FIG. 1 gives a diagrammatic plan view of a flying shears according to the invention.

In the figures a flying shears 10 has a structure substantially of the same type as the flying shears disclosed in IT-A-1.214.194.

In particular, the flying shears 10 has a D.C. motor 31 for each of the two axes 12 of the blade-holder drums 30.

The shearing axis 15 passes between the two axes 12 and the width of the shearing blades 13.

A bar 11 arrives from a channel 14 located downstream of the last rolling mill stand of a rolling train and, being drawn by a drawing assembly 22, is guided into a first one-channel switch 16 located upstream of a shearing area 35.

The first one-channel switch 16 can be oriented laterally around its end 39 nearest to the drawing assembly 22 about a rotation pivot 17 on a plane parallel to, and between, the planes containing the axes 12 of the blade-holder drums 30.

This orientation movement causes the end 40 of the one-channel switch 16 nearest to the shearing area 35 to follow a trajectory shaped substantially as an arc of a circle.

The orientation of the first one-channel switch 16 is defined between two extreme lateral positions cooperating possibly with stationary extreme guides (not shown here).

These stationary extreme guides have the purpose of guiding the bar 11 in the positions where the bar 11 undergoes maximum deflection during its movement in the flying shears 10.

These extreme positions are advantageously positioned symmetrically in relation to the shearing axis 15.

A second one-channel switch 20 is included downstream of the shearing area 35 and it too can be oriented laterally about a pivot 32 substantially on the same plane of orientation as the first one-channel switch 16.

In a manner analogous to the first one-channel switch 16, the second one-channel switch 20 in its movement of orientation has its end 139 farthest from the shearing area 35 stationary, whereas its end 140 near the shearing area 35 follows a trajectory shaped substantially as an arc of a circle.

The movement of the two one-channel switches 16,20 is perfectly synchronised, so that their ends 40,140 near the shearing area 35 always face each other and the bar 11 is guided by the first one-channel switch 16 to the second one-channel switch 20 without any danger of jamming or obstruction.

The first 16 and second 20 one-channel switches are both governed by respective synchronised drive motors 21 connected together electrically by an encoder or mechanically by a mechanical shaft.

According to a variant only one drive motor 21 is included and is placed on one side for both the switches 16 and 20.

The rotation of the blade-holder drums 30 and the orientation of the one-channel switches 16,20 are controlled by a governing and controlling software unit which ensures synchronisation of the switches 16,20 and the blade-holder drums 30 so that the bar 11 passes through the shearing blades 13 substantially at one single precise point and in one single precise condition.

During the shearing step the lateral positions of the switches 16,20 in relation to the shearing axis 15 are correlated with the circumferential positions of the blades 13 on the blade-holder drums 30 in such a way that, when the axes of the switches 16,20 coincide substantially with the shearing axis 15, then those blades 13 too lie substantially on the vertical plane containing the axes 12 and between those axes 12.

In the example shown in FIG. 2 each motor 21 drives a pinion 34 associated with a rack 33; the racks 33 are attached solidly to the relative switch 16 or 20, and the orientations of the switches 16 and 20 are correctly synchronised at every moment.

According to the invention first blades 13 to crop the leading and trailing ends of the bar and second scrap-shearing blades 18 to shear for scrap the leading and trailing end segments are fitted to the blade-holder drums 30.

Figure 7:
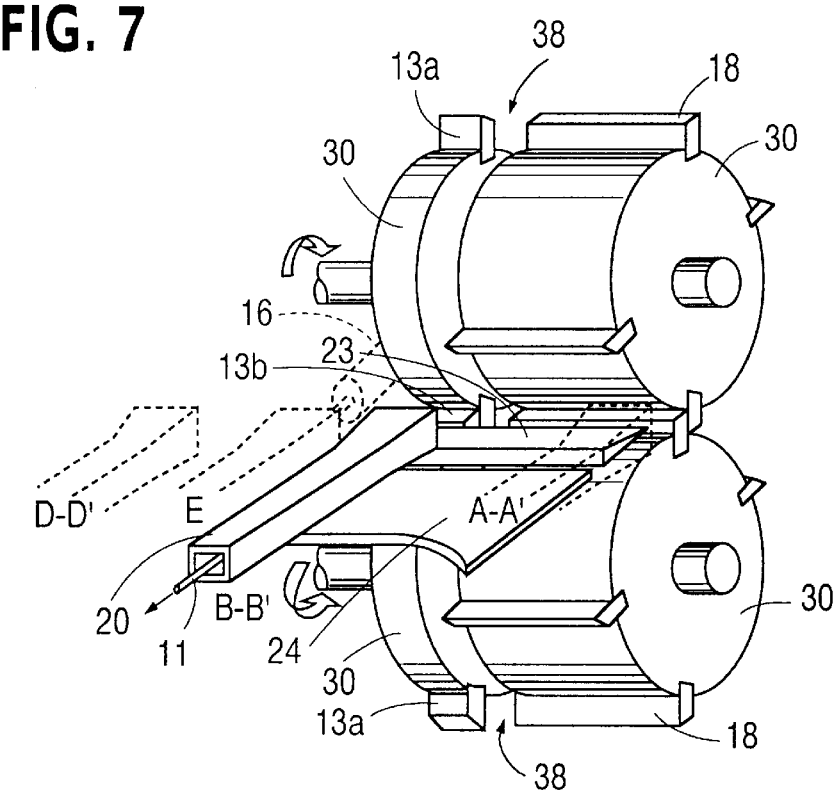
FIGS. 7 and 8 are perspective views showing the arrangement of shearing blades according to alternative embodiments of the invention.

The blade-holder drums 30 bearing the second scrap-shearing blades 18 are advantageously separate from the drums bearing the first shearing blades 13 and are positioned beside and parallel to those drums, as shown in FIG. 7.

Figure 8:
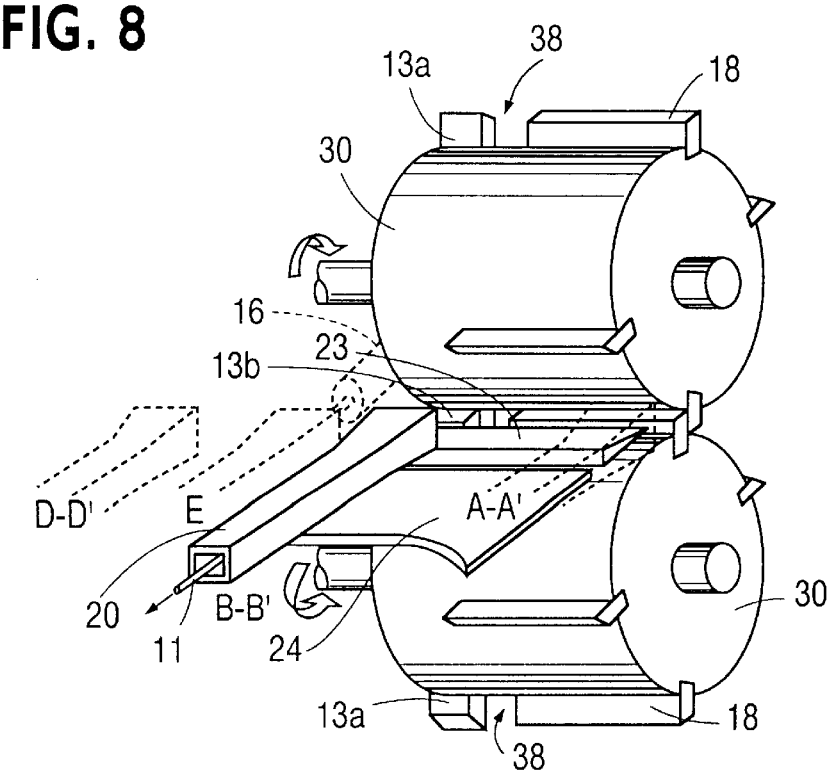

According to a variant blade-holder drums 30 are included which bear the second scrap-shearing blades 18 and the first shearing blades 13 in coordinated reciprocal positions, the first 13 and second 18 blades having a common plane of positioning, as shown in FIG. 8.

In particular, the first shearing blades 13 are arranged in a substantially central position of the flying shears 10 and perform the cycles of shearing the leading and trailing ends of the bar 11.

The second scrap-shearing blades 18 are positioned substantially on the plane of orientation of the switches 16 and 20 and laterally to the first blades 13, and, more exactly, at the tract which runs from the initial starting position, or first extreme position, of the switches substantially up to the vicinity of the shearing area 35.

According to a variant of the invention a space 38 devoid of blades is included between the second scrap-shearing blades 18 and the first shearing blades 13 and has the purpose of enabling, depending on the speed of feed of the bar 11, a segment of the leading or trailing end to be formed which has a length greater than the other segments and which can be used as a sample for the performance of structural and metallurgical analyses, as shown in FIGS. 7 and 8.

According to the invention the bar 11 coming from the upstream channel 14, on reaching a certain position, causes a displacement by rotation of the switches 16 and 20, which are displaced from their first extreme starting position towards the shearing area 35.

Figure 4:
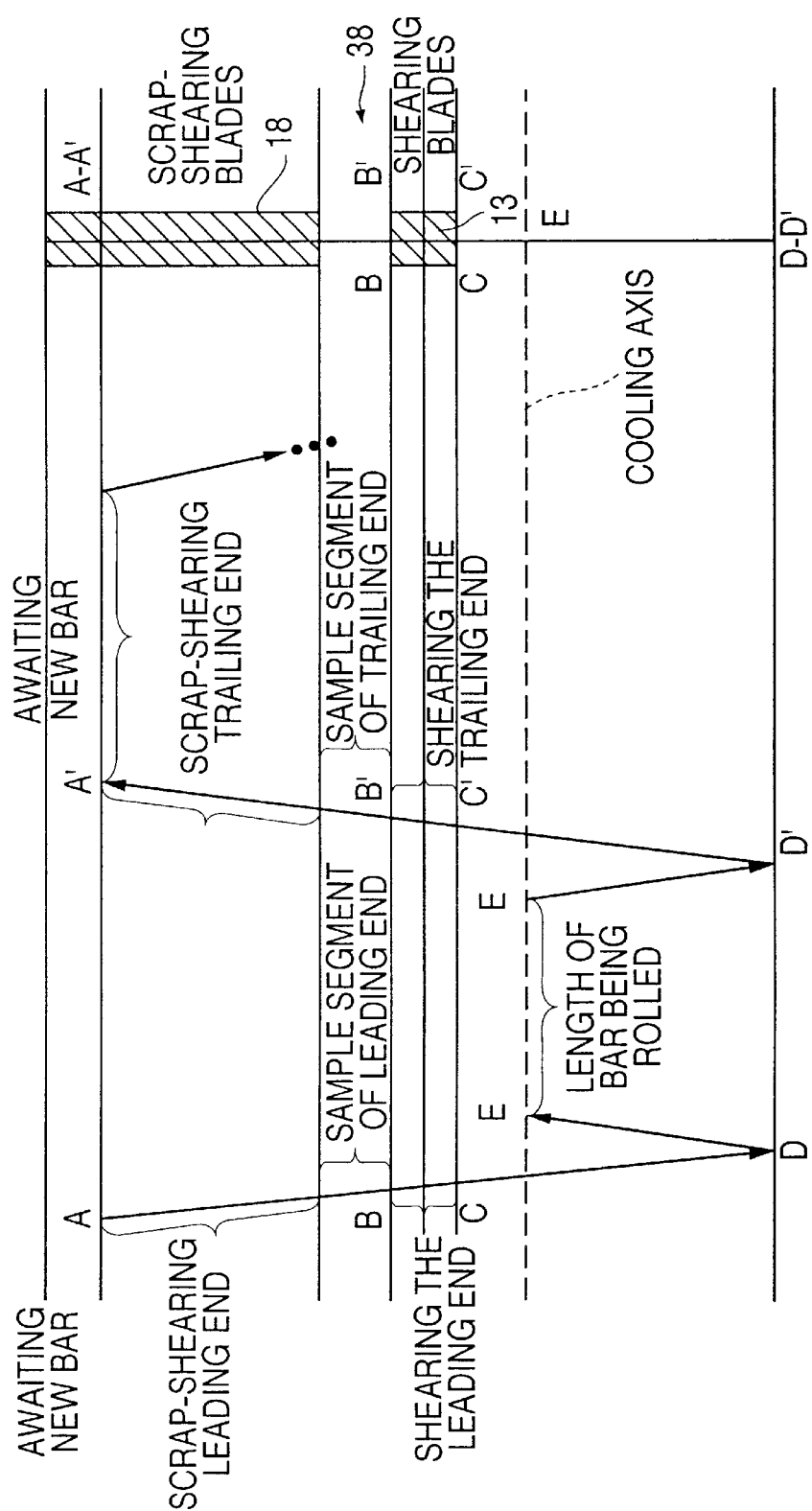
FIG. 4 is a diagram of the working cycle of the flying shears according to the invention.

In FIGS. 2 and 4 "A" indicates the starting position, or first extreme position, of the switches 16,20, this position being also the position in which the switches 16,20 stay while awaiting a new bar 11.

During the displacement from the first extreme position "A" towards the shearing area 35 the first switch 16 directs the leading point of the bar 11 leaving the end 40 of the first switch 16 to the second scrap-shearing blades 18 so as to shear for scrap a given length of the leading end of the bar 11.

When the first switch 16 is positioned in the shearing area 35 in the position referenced with "B", the first shearing blades 13 act to shear the leading end of the bar 11.

Figure 6A:
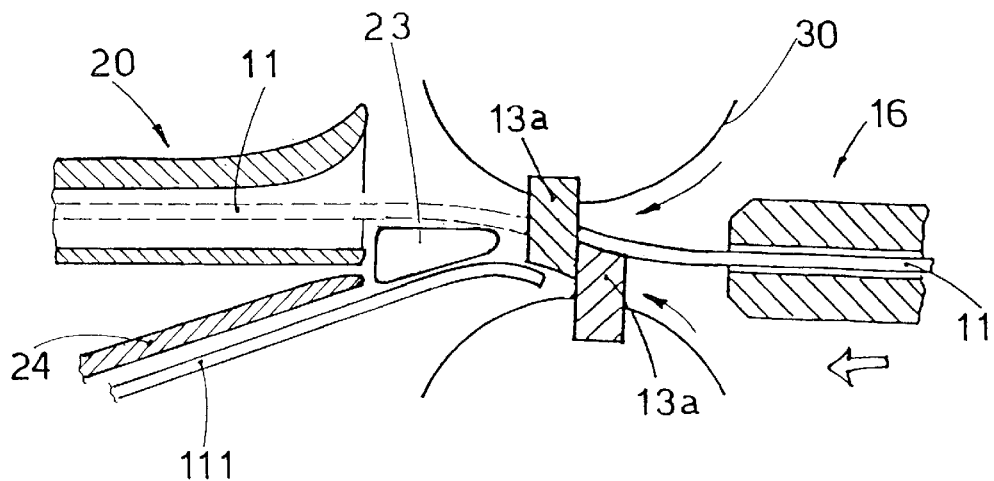
FIGS. 6a and 6b respectively show the steps for shearing the leading end and trailing end of the bar.

In particular, a specific pair of opposed shearing blades 13a is included on the blade-holder drums 30 and is conformed in this case in such a way as to lift the point of the bar 11 after the shearing of the leading end (FIG. 6a), the purpose being to direct the bar 11 correctly and naturally into the second one-channel switch 20 positioned downstream of the shearing area 35, while the sheared leading end segment 111 is directed downwards in a natural manner towards suitable collection means.

The bar 11 in the shearing position cooperates with a movable deflector plate 23 positioned immediately downstream of the shearing area 35 and between the shearing area 35 and the second one-channel switch 20.

This movable deflector plate 23 in association with a pneumatic cylinder/piston actuator 19 performing lateral positioning is able to take up a first position for pre-arranging the bar 11 for the shearing of its leading end (FIG. 5a) and a second position for pre-arranging the bar 11 for the shearing of its trailing end (FIG. 5b).

This movable deflector plate 23 moves from one position to the other in a manner coordinated with the performance of the shearing, these two positions being defined by a displacement travel of "l".

In particular, the movable deflector plate 23 comprises diversion means 123 and is able to divert the point of the bar 11 so as to direct that point into the second one-channel switch 20 downstream after the shearing of the leading end (position "C" of FIG. 4), and to divert the sheared leading end segment 111 so as to direct that segment towards the underlying means which collect these segments (position "B").

The positions taken up by the movable deflector plate 23 are determined by the positions which the diversion means 123 of the movable deflector plate 23 itself take up on one side or the other side of the shearing axis 15 so as to obtain correct guiding of the bar 11 and of the sheared segments.

Figure 6B:
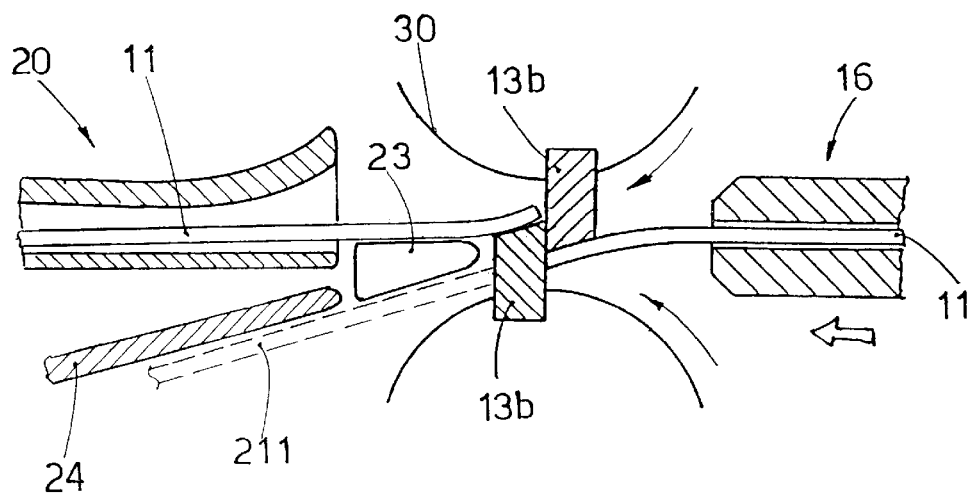

In the shearing of the trailing end the sheared end is lowered so that the trailing end segment 211 is guided towards the underlying collection means while the bar 11 remains guided into the second one-channel switch 20 (FIG. 6b).

When the leading end, has been sheared with the bar 11 in the position "C", the switches 16,20 are braked and are displaced, while decelerating, up to the extreme braking position, or second extreme position, referenced with "D", whence they return alongside the shearing blades 13 on the same axis as the coiling axis 37 (position "E"), but without passing again through the shearing area 35, and halt in that position during the whole rolling period.

This situation enables a coiling cycle to be carried out with the bar 11 guided along a substantially straight trajectory, thus obviating as much as possible any deflections and loops in the bar during the coiling.

In the cycle of shearing the trailing end, after the movable deflector plate 23 has been positioned in the position for the shearing of the trailing end, the switches 16,20 return from the position "E" of the feed of the bar to the second extreme position "D'" so as to start their accelerated travel for the shearing of the trailing end, which takes place in the trailing end shearing position "C'".

The blades 13b to shear the trailing end are conformed to lower the end to be sheared, so that the sheared trailing end segment 211 is correctly directed and takes up the position "B'" at least in the shearing moment.

When the trailing end has been sheared, the switches 16,20 proceed with a braked movement to the first extreme position "A'", where they halt and await a new cycle.

In the tract running from position "B'" to position "A'" the second scrap-shearing blades 18 are caused to act to shear for scrap the sheared segment of the trailing end.

The second scrap-shearing blades 18 cooperate at their lower end with collection means, which consist in this case of a guide channel 24 suitable to convey the segments towards a cyclone 25 that brakes the scrap-sheared segments.

The second scrap-shearing blades 18 are arranged on the relative blade-holder drums 30 in such a way that they direct the end of the sheared segment downwards so as to guide that segment into the guide channel 24.

The braking cyclone 25 is equipped in its lower portion with a discharge hole 36, from which the scrap-sheared segments may bounce out of the flying shears 10.

When it is desired to obtain a sample of the bar 11 so as to carry out structural and metallurgical analyses, the free space 38 between the first shearing blades 13 and the second scrap-shearing blades 18 enables the last leading end segment and first trailing end segment to be recognised because of their greater length than the other segments.

According to a variant which is not shown here, the flying shears 10 can be equipped to discharge in a differentiated manner the leading end and trailing end segments having a greater length.

The guide channel 24 can be divided, for instance, into two channels and can cooperate with a movable switch to direct the leading end and trailing end segments of a greater length and the normal common segments in different manners into their relative channels.

The second one-channel switch 20, in this case, cooperates downstream with an outlet drawing assembly 26 of a coil-forming headstock 27, which in turn discharges the formed coils 28 onto a discharge conveyor 29.

According to a variant which is not shown here, a winding unit commonly used instead of the coil-forming headstock 27 to produce a more compact coil is included downstream of the second one-channel switch 20.

I claim:

1. A method to shear ends of a bar travelling through high-speed flying shears, the high speed flying shears comprising at least one pair of blade-holder drums defining a shearing area therebetween, the blade-holder drums rotating in opposite directions about spaced, parallel axes of rotation, the at least one pair of blade-holder drums being provide with first shearing blades and second scrap-shearing blades, the first shearing blades being laterally offset in a direction along said parallel axes from said second scrap-shearing blades;

a first one-channel switch provided upstream of said at least one pair of blade-holder drums for conveying the bar lengthwise through said shearing area, said first one-channel switch being capable of being oriented laterally by rotation on a plane substantially containing an axis of travel of the bar and parallel to and between planes containing the axes of rotation of the at least one pair of blade-holder drums; and a second one-channel switch provided downstream of said at least one pair of blade-holder drums for conveying the bar lengthwise from said shearing area downstream to a coil forming headstock or winding unit, the second one-channel switch being capable of being oriented laterally by rotation substantially on the same plane of rotation as said first one-channel switch and in synchronization therewith;

wherein a lateral orientation of said first and second one-channel switches is synchronized with a circumferential position of at least the first shearing blades on said at least one pair of blade-holder drums, the lateral orientation including a feed position (E) for feed of the bar adjacent the first shearing blades, and first (A–A') and second (D–D') extreme positions on opposed sides of the feed position (E), the feed position (E) being provided between the first shearing blades and the second extreme position (D–D'), wherein said method comprises:

guiding the bar into the first one-channel switch, the first one-channel switch being in the first extreme position (A–A');

displacing the first one-channel switch from the first extreme position (A–A') to said second extreme position (D–D') by passing through said shearing area in which a leading segment of the bar is sheared from the remaining bar by said first shearing blades; and then returning said first one-channel switch to said feed position (E).

2. Method as in claim 1, in which before shearing the leading segment from the remaining bar and during movement of the first one-channel switch from the first extreme position (A–A') to the shearing area, an initial part of the leading segment of the bar is sheared for scrap, and, during shearing of the leading segment, the leading end of the remaining bar is displaced to be directed into the second one-channel switch.

3. Method as in claim 2, in which, after shearing the initial part of the leading segment the bar for scrap and before shearing a final part of the leading segment from the remaining bar and during movement from the first extreme position (A–A') to the shearing area, a sample segment between the initial part and the remaining bar is sheared and collected while the bar is being displaced.

4. Method as in claim 3, wherein the sample segment sheared has a length proportional to a free space included between the first shearing blades and the second scrap-shearing blades.

5. Method as in claim 2, further comprising the step of collecting the scrap sheared from the initial part of the leading segment of the bar in means for collecting segments of bar provided downstream of the scrap-shearing blades.

6. Method as in claim 1, further comprising the step of displacing the first and second one-channel switches from the feed position (E) to the second extreme position (D–D') when a terminal end of the bar is approaching the flying shears; and then displacing the first and second one-channel switches from said second extreme position (D–D') to said first extreme position (A–A') by passing through said shearing area in which a trailing segment of the bar is sheared from the remaining bar by said first shearing blades.

7. Method as in claim 6, in which after shearing the trailing segment from the remaining bar and during movement from the shearing area to the first extreme position (A–A') at least a final part of the trailing segment is sheared for scrap while being displaced.

8. Method as in claim 7, in which, after shearing the trailing segment from the remaining bar and before shearing the trailing segment for scrap and during movement from the shearing area to the first extreme position (A–A'), a sample segment at an initial part of the trailing segment is sheared and collected while the bar is being displaced.

9. Method as in claim 8, wherein the sample segment sheared has a length proportional to a free space included between the first shearing blades and the second scrap-shearing blades.

10. Method as in claim 7, further comprising the steps of collecting the scrap sheared from the final part of the trailing segment of the bar in means for collecting segments of bar provided downstream of the scrap-shearing blades.

11. Method as in claim 6, wherein the bar is traveling through the flying shears at a speed of more than 120 meters per second.

12. High-speed flying shears for shearing bar, comprising:
at least one pair of blade-holder drums defining a shearing area therebetween, the blade-holder drums rotating in opposite directions about spaced, parallel axes of rotation, the at least one pair of blade-holder drums being provided with first shearing blades for shearing leading and trailing segments of the bar from the remaining bar and second scrap-shearing blades for shearing the leading segment, which is sheared from the bar by the first shearing blades, into a plurality of scrap segments and for shearing the trailing segment, which is sheared from the bar by the first shearing blades, into a plurality of scrap segments, the first shearing blades being laterally offset in a direction along said parallel axes from said second scrap-shearing blades;
a first one-channel switch provided upstream of said at least one pair of blade-holder drums for conveying the bar lengthwise through said shearing area, said first one-channel switch being capable of being oriented laterally by rotation on a rotation plane substantially containing an axis of travel of the bar and parallel to and between planes containing the axes of rotation of the at least one pair of blade-holder drums;
a second one-channel switch provided downstream of said at least one pair of blade-holder drums for conveying the bar lengthwise from said shearing area downstream to a coil forming headstock or winding unit, the second one-channel switch being capable of being oriented laterally by rotation substantially on the rotation plane of said first one-channel switch and in synchronization therewith; and means for providing a lateral orientation of said first and second one-channel switches associated with a circumferential position of at least the first shearing blades on said at least one pair of blade-holder drums, the lateral orientation including a feed position (E) for feed of the bar in a vicinity of the first shearing blades, and first (A–A') and second (D–D') extreme positions on opposed sides of the feed position (E), the feed position (E) being provided between the first shearing blades and the second extreme position (D–D').

13. Flying shears as in claim 12, wherein the at least one pair of blade-holder drums comprises two pairs of blade-holder drums, a first pair of blade-holder drums bearing the first shearing blades, while a second pair of blade-holder drums is coaxial with the first pair and bears the second scrap-shearing blades.

14. Flying shears as in claim 13, in which one of the first pair of blade-holder drums bearing the first shearing blades and one of the second pair of blade-holder drums bearing the second scrap-shearing blades are connected to one single drive shaft and rotate in synchronization.

15. Flying shears as in claim 13, in which the first shearing blades consist of two pairs of blades positioned diametrically opposite to each other.

16. Flying shears as in claim 15, in which a first pair of the two pairs of first shearing blades is positioned to shear the leading segment from the remaining bar and to direct the remaining bar after shearing into said second one-channel switch and a second pair of the two pairs of first shearing blades is positioned to shear the trailing segment from the remaining bar and to direct at least one individual segment sheared from the trailing segment away from said second one-channel switch into a collection means.

17. Flying shears as in claim 13, wherein each drum of said second pair of blade-holder drums bears a plurality of second scrap-shearing blades.

18. Flying shears as in claim 12, in which the first shearing blades consist of first and second pairs of blades positioned diametrically opposite to each other.

19. Flying shears as in claim 18, in which the first pair of the two pairs of first shearing blades is positioned to shear the leading segment from the bar and to direct the remaining bar after shearing into said second one-channel switch and the second pair of the two pairs of first shearing blades is positioned to shear the trailing segment from the bar and to direct at least one individual segment sheared from the trailing segment away from said second one-channel switch into a collection means.

20. Flying shears as in claim 18, in which the first pair of blades of the first shearing blades is arranged to shear the leading segment from the bar and comprises blades provided with cutting edges disposed at an angle to horizontal to lift a leading end of the remaining bar after the leading segment is sheared.

21. Flying shears as in claim 20, in which cutting edges of the second pair of blades of the first shearing blades is arranged to shear the trailing segment from the bar and comprises blades provided at an angle to the horizontal to lower a leading end of the sheared trailing segment which is to be sheared for scrap.

22. Flying shears as in claim 21, in which cutting edges of the second scrap-shearing blades are provided at an angle to the horizontal to lower a leading end of individual segments sheared for scrap.

23. Flying shears as in claim 12, in which a free space is included between the first shearing blades and the second scrap-shearing blades.

24. Flying shears as in claim 23, further comprising collection means for collecting a sample segment of the trailing segment, the collection means being provided downstream of the blade holder drums.

25. Flying shears as in claim 12, in which the second scrap-shearing blades are provided between the first shearing blades and the first extreme position (A–A').

26. Flying shears as in claim 12, in which the scrap-shearing blades cooperate with downstream means for collecting segments of the bar.

27. Flying shears as in claim 12, further comprising collection means for collecting a sample segment of the leading segment, the collection means being provided downstream of the blade holder drums.

28. Flying shears as in claim 12, in which the first shearing blades and the second scrap-shearing blades are provided on one pair of drums.

29. Flying shears as in claim 12, further comprising a movable deflector plate provided immediately downstream of the first shearing blades and having a first position for the shearing of the leading end and a second position for the shearing of the trailing end of the bar.

30. Flying shears as in claim 12, wherein each drum of the at least one pair of blade-holder drums bearing the second scrap-shearing blades bears a plurality of second scrap-shearing blades.

* * * * *